United States Patent
Lenz et al.

(10) Patent No.: US 11,508,164 B2
(45) Date of Patent: Nov. 22, 2022

(54) METHOD FOR DETERMINING A DEGREE OF OVERLAP OF AN OBJECT WITH A LANE

(71) Applicant: Robert Bosch GmbH, Stuttgart (DE)

(72) Inventors: Philip Lenz, Holle (DE); Alexander Lengsfeld, Hildesheim (DE); Marcel Brueckner, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 16/896,898

(22) Filed: Jun. 9, 2020

(65) Prior Publication Data
US 2020/0394423 A1  Dec. 17, 2020

(30) Foreign Application Priority Data

Jun. 12, 2019 (DE) .......................... 102019208507.5

(51) Int. Cl.
*G06V 20/56* (2022.01)
*G08G 1/16* (2006.01)
*G06V 10/44* (2022.01)
*G06V 20/58* (2022.01)

(52) U.S. Cl.
CPC ............ *G06V 20/588* (2022.01); *G06V 10/44* (2022.01); *G06V 20/58* (2022.01); *G08G 1/167* (2013.01)

(58) Field of Classification Search
CPC ...... G06V 20/588; G06V 10/44; G06V 20/58; G08G 1/167; B60W 30/16; B60W 50/14; B60W 2050/143; B60W 2554/80
See application file for complete search history.

(56) References Cited

U.S. PATENT DOCUMENTS

| | | | | |
|---|---|---|---|---|
| 6,819,779 | B1* | 11/2004 | Nichani | G06V 10/44 382/104 |
| 2010/0079590 | A1* | 4/2010 | Kuehnle | G06T 7/60 340/436 |
| 2010/0121577 | A1* | 5/2010 | Zhang | G06V 20/588 382/104 |
| 2018/0165822 | A1* | 6/2018 | Uliyar | G06T 7/80 |
| 2018/0181817 | A1* | 6/2018 | Yan | G06N 3/02 |
| 2018/0188059 | A1* | 7/2018 | Wheeler | G01C 21/32 |
| 2018/0373941 | A1* | 12/2018 | Kwant | G08G 1/0145 |
| 2019/0325234 | A1* | 10/2019 | Zhu | G06T 7/12 |
| 2020/0302189 | A1* | 9/2020 | Shu | G06V 10/82 |
| 2020/0394423 | A1* | 12/2020 | Lenz | G06V 20/588 |

* cited by examiner

*Primary Examiner* — Md K Talukder
(74) *Attorney, Agent, or Firm* — Norton Rose Fulbright US LLP; Gerard Messina

(57) ABSTRACT

A method for determining a degree of overlap of at least one object with at least one lane via a representation of a surrounding environment of a platform as a two-dimensional pixel data field. The method includes allocating at least one lane pixel group to pixels of the two-dimensional pixel data field, which correspondingly represent at least one lane; allocating at least one object pixel group to pixels of the two-dimensional pixel data field, which correspondingly represent at least one object; defining at least one object pixel pair in the two-dimensional pixel data field, which pair characterizes a width of the at least one object pixel group; and comparing the object pixel pair and the lane pixel group in the two-dimensional pixel data field.

14 Claims, 3 Drawing Sheets

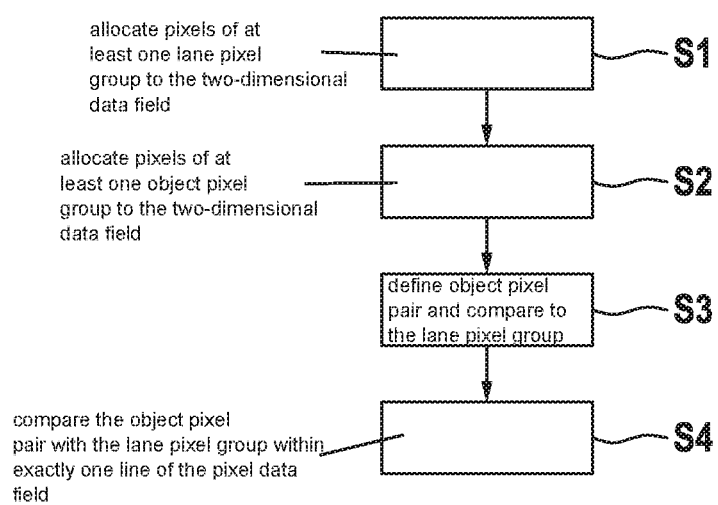

METHOD FOR DETERMINING A DEGREE OF OVERLAP OF AN OBJECT WITH A LANE

CROSS REFERENCE

The present application claims the benefit under 35 U.S.C. § 119 of German Patent Application No. DE 102019208507.5 filed on Jun. 12, 2019, which is expressly incorporated herein by reference in its entirety.

FIELD

The present invention relates to a method for determining a degree of overlap of at least one object with at least one lane using a representation of a surrounding environment of a platform as a two-dimensional pixel data field.

BACKGROUND INFORMATION

Driver assistance systems typically use radar sensors for distance regulation. These radar sensors enable a precise determination of the distance of the radar sensor from objects such as motor vehicles. For a distance measurement with a distance regulation that is based on the measurement, a relevant target object for the distance regulation must be selectable from a plurality of objects that are capable of being acquired by a radar sensor. Because radar sensors determine distances directly, according to the existing art a selection of the target vehicle takes place in three-dimensional space.

In a one-sensor strategy for distance regulation using radar data, the selection of a target vehicle is derived only from a temporal sequence of the objects, without knowledge of the course of lanes.

In a two-sensor system for distance regulation, having a radar sensor and a video sensor having video-based lane marking recognition, the lane information is transformed into the three-dimensional measurement space of the radar sensor.

SUMMARY

A transformation from a two-dimensional image space into a three-dimensional space is ambiguous and subject to noise, so that a video-based one-sensor strategy that transfers a measurement, for example of a lane marking, of the image sensor into a three-dimensional space results in the following disadvantages.

In the transformation of lane markings recognized in two-dimensional space, i.e. in a two-dimensional (2D) representation of a surrounding environment of a vehicle, into a three-dimensional (3D) space, it is possible for numerous errors to occur or for modeling assumptions to be violated. This results in incorrectly identified lanes in a three-dimensional representation of the surrounding environment. The following selection of the target vehicle can however compensate outliers and a high level of noise only to a limited extent. This has the result that incorrect objects, or no objects, are selected as target object.

In particular at greater distances, the effect of the named problems is particularly strong. This is due on the one hand to the range of the marking recognition, which is limited compared to vehicle detection or object detection. On the other hand, the noise of the transformation from a two-dimensional representation of the environment to a three-dimensional one increases exponentially with distance in video sensors. As a result, for example a stationary vehicle at the end of a traffic jam may be detected very early, but may not be allocated to a lane. As a result, an intervention that may be necessary in the guiding of an at least partly automated vehicle will not be easily realizable.

The present invention provides a method for determining a degree of overlap of an object with a lane, a method for identifying a target object, a method for allocating at least one object to lanes, a device, a computer program, and a machine-readable storage medium. Advantageous example embodiments of the present invention are described herein.

The present invention is based on the surprising finding that evaluations and comparisons of dimensions of elements of a representation of a surrounding environment of a platform, such as a vehicle, can be more accurate in a two-dimensional representation than in a three-dimensional representation.

An example method according to an exemplary embodiment determines a degree of overlap of at least one object with at least one lane using a representation of a surrounding environment of a platform as a two-dimensional pixel data field.

Here, in a step at least one lane pixel group is allocated to pixels of the two-dimensional pixel data field, which correspondingly represent at least one lane.

In a further step, at least one object pixel group is allocated to pixels of the two-dimensional pixel data field, which correspondingly represent at least one object.

In a further step, at least one object pixel pair is defined in the two-dimensional pixel data field, which pair characterizes a width of the at least one object pixel group.

In a further step, the object pixel pair and the lane pixel group are compared in the two-dimensional pixel data field.

In the present description as a whole, the sequence of method steps is presented in such a way that the method can easily be followed, or corresponds to a preferred specific embodiment. However, the person skilled in the art will recognize that many of the method steps may also take place in a different sequence while leading to the same result. The sequence of the method steps can be correspondingly modified in this way.

For an at least partly automated vehicle, but also for a driver assistance system, the allocation of objects of different types identified by sensor systems, such as vehicles, to a lane in the traffic environment is of great importance. Such an allocation can be quantified using a degree of overlap, because what is relevant is not only whether a vehicle is traveling entirely within a lane. For safe driving, lane changes, in which the degree of overlap with individual lanes increases or decreases, are in particular relevant; moreover, the recognition of a partial occupancy of a lane by another vehicle is for example relevant for a decision relating to whether a lane is available to be driven on.

A degree of overlap, for example of an object with a lane, indicates what portion of an extension of an object coincides with an extension of a lane. If, as an example of an object, a vehicle is driving completely within a lane, the overlap would be complete, i.e., the degree of overlap would be 100%. When there is a change of lane by an object, such as a vehicle, such a degree of overlap may move through a value of from 0 to 100%, thus indicating to what extent a lane change has been completed. Analogously, the degree of overlap can correspondingly also decrease.

A representation of an environment surrounding a platform, such as an at least partly automated vehicle, a robot, or a vehicle having a driver assistance system, for example for further evaluations, can be done using a two-dimensional representation of the three-dimensional environment. In particular, such a two-dimensional representation can be realized by a two-dimensional data field in which the individual positions, characterized with two dimensions, carry information that describes and/or represents the three-dimensional surrounding environment after its transformation into two dimensions. In particular, the information can relate to optical properties of the three-dimensional surrounding environment, but these individual positions, defined with two dimensions, can also contain further information. For example, such information may include the output values of an optical imaging system such as a digital camera or a digital video system, so that this information includes brightness information and color information. In this case, for example the optical imaging of a surrounding environment would be a representation of a surrounding environment that can be indicated by a two-dimensional pixel data field. In addition, information based on different sensor types concerning the three-dimensional surrounding environment can, alternatively or in addition, be used for such a two-dimensional representation of the three-dimensional surrounding environment. In particular, any camera systems, such as front mono cameras, stereo cameras, fisheye cameras, or any multi-camera systems, may be used. A lidar sensor is a further example of an imaging sensor system.

For better understanding of the example method, in the present context, a two-dimensional pixel data field is discussed, where the pixel data of the two-dimensional field are to be understood in the sense described above, and are not limited to optical pixel data.

As objects, both static and dynamic objects can be identified and allocated. For a surrounding environment, such as a traffic situation, these objects may represent in particular motor vehicles such as passenger vehicles or trucks.

Such a platform can be in particular a mobile platform, for example in particular an at least partly automated vehicle, a drone, a robot system, or a service robot. Such a mobile platform can however also be a vehicle equipped with a driver assistance system.

A lane indicates the region of a roadway that is available to a vehicle for travel in a direction. A lane indicates, by markings, a strip on a roadway that is provided for travel in a defined direction. Lanes often have elements that serve only to bound the lane, in the form of constructive elements such as curbs, railings, or walls, or a different surface quality, such as a transition from asphalt to grass.

An identification of a lane can be realized by various different methods, such as an identification of roadway markings or lane markings within an optical image, for example using mathematical convolution operations, which can increase brightness contrast, or other suitable techniques. Such an identification can be done using the two-dimensional pixel data field, or also in particular using other methods that evaluate information from the three-dimensional surrounding environment. Such an identified lane is allocated to a lane pixel group in the two-dimensional pixel data field, which thus represent the lane.

An identification of objects in the surrounding environment of a platform can be carried out using a multiplicity of methods, both using the two-dimensional pixel data field and also for example using three-dimensional representations of the surrounding environment, for example using methods that are based on rule-based logic or neural network technologies. These identified objects are then each allocated in the two-dimensional pixel data field to an object pixel group, which groups thus represent the corresponding objects.

For the characterization of a width of at least one object pixel group, an object pixel pair is defined in the two-dimensional pixel data field. Corresponding to the quality of the identified object, this object pixel pair can be defined in various ways. For example, a rectangular frame can be defined around an object pixel group in the two-dimensional pixel data field, the frame enclosing the object pixel pair. The object pixel pair can then be selected on this rectangular frame in such a way that it defines a width of the object pixel group. As a further example, the object pixel pair can also be defined by pixels in the two-dimensional pixel data field that lie maximally far apart from one another on a lower edge of the object pixel group.

By comparing the object pixel pair with the lane pixel group in the two-dimensional pixel data field, a ratio of a width of an object to an extension or a width of the lane pixel group that represents a lane in the two-dimensional pixel data field can be determined.

This simple method can achieve a high degree of accuracy, because it does not require any transformation from a two-dimensional representation of the surrounding environment into a three-dimensional representation. A transformation from a two-dimensional representation into a three-dimensional representation of the surrounding environment is not unambiguous and is therefore subject to error. In this method, the information about the objects and the information about the lanes are fused in the two-dimensional pixel data field, and can thus be put into relation, or compared, with one another using simple steps. The method can be used in parallel with other methods that also determine a degree of overlap of objects with lanes. In some existing systems, the method can, if applicable, also be realized by modifying the software.

According to an example embodiment of the method according to the present invention, it is provided that the at least one object pixel pair is compared with the lane pixel group within exactly one pixel line of the pixel data field.

In this way, it can be achieved that an offset that is as small as possible can be achieved in the determination of the degree of overlap relative to the position of the surrounding environment. This is because through a transformation of the naturally three-dimensional environment into a two-dimensional representation, a perspective distortion always takes place that, when there is an offset, can cause an error in the determination of the degree of overlap.

According to an example embodiment of the method according to the present invention, it is provided that a first set of pixels that are situated between the object pixel pair in the two-dimensional pixel data field and enclose the object pixel pair are compared with a second set of pixels of the lane pixel group, that are situated in the same pixel line of the pixel data field as the object pixel pair.

In this way, the width of the object can be easily described and counted with a first set of pixels, and a width of the lane can easily be described and counted with a second set of pixels in the two-dimensional pixel data field.

According to an example embodiment of the method according to the present invention, it is provided that, in a further step of the method, an intersection of pixels of the first set of pixels with pixels of the second set of pixels is determined. In a further step, the degree of overlap of the at least one object with the at least one lane is determined by calculating the ratios of a number of pixels of the determined intersection to a number of pixels of the first set.

In this way, it can quantitatively be determined to what degree the width of an object overlaps with the lane.

According to an example embodiment of the method according to the present invention, it is provided that the at least one represented object is allocated to a category and the degree of overlap is determined as a function of the result of the categorization.

Using such a categorization, it can be decided whether the determination of the degree of overlap is to be carried out, or whether in the determination of the degree of overlap a determination of the object width will take place as a function of the categorization. For example, the determination of the width of a truck and of a personal vehicle may be carried out in different ways.

According to an example embodiment of the method according to the present invention, it is provided that a pixel frame is allocated in the two-dimensional pixel data field, which frame encloses the at least one object pixel group. The object pixel pair that characterizes a width of the at least one object pixel group is situated on the pixel frame in such a way that it characterizes a width of the object pixel group.

In addition, a pixel frame can also be adapted to the shape of the object, or of the object pixel group. This then corresponds to an outer surface of an object, and a width of the object pixel group can be characterized by an object pixel pair that is maximally far apart from one another on this pixel frame, adapted to the shape, within a line. In addition, points of contact of the object with the lane can be identified, such as points of contact of the tires with the lane, and the width of the object pixel group can then be characterized by these points.

According to a further example embodiment of the method according to the present invention, it is provided that the identification of the at least one object represented by an object pixel group is done using a rule-based logic or using a neural network. The identification can take place using the two-dimensional pixel data field or using methods that run three-dimensional space, the identified object then being allocated, in a further step, to pixels of an object pixel group of the two-dimensional pixel data field.

With these different methods for identifying objects in the surrounding environment of a platform, the most suitable method for identifying objects can be selected for each surrounding environment and for each object.

According to a further example embodiment of the method according to the present invention, it is provided that the at least one lane pixel group is allocated to the pixels of the two-dimensional pixel data field using at least one marking pixel group of the two-dimensional pixel data field that represents a lane boundary.

If, via the representation of the surrounding environment in the two-dimensional pixel data field or in some other way, only one lane boundary is identified, this lane boundary can be allocated to pixels of the two-dimensional pixel data field, and can be allocated to a lane pixel group in the two-dimensional pixel data field, for example using assumptions about a lane width.

According to a further example embodiment of the method according to the present invention, it is provided that at least one marking pixel group is extended through an extrapolation in the two-dimensional pixel data field.

Because in practice an identification of objects can take place at a greater distance from the platform than can the identification of lane boundaries, such as in particular roadway markings, in this embodiment of the method, the degree of overlap of objects with lanes can reliably be carried out at a greater distance from the platform, and thus such a degree of overlap may be determinable for a larger number of identified objects. Such an extrapolation is obviously particularly easy to carry out in the two-dimensional representation of a two-dimensional pixel data field.

According to a further example embodiment of the method according to the present invention, it is provided that at least one lane pixel group in the two-dimensional pixel data field or lane marking is allocated and/or extended via an extrapolated marking pixel group.

According to a further example embodiment of the method according to the present invention, it is provided that the lane pixel group or the marking pixel group is extrapolated using a linear function or a polynomial function.

According to an example embodiment of the method according to the present invention, it is provided that the left and/or right boundary of the home lane is extrapolated in the image space of the two-dimensional pixel data field.

Here, the home lane is the lane that the platform is traveling on, or on which the platform itself is situated.

Because the home lane for the platform, such as an at least partly automated vehicle or a driver assistance system, is of particular importance, safer or more comfortable driving can be achieved through a determination, which can be carried out at a great distance from the platform, of the degree of overlap of an identified object with the home lane, through the extension of this lane via extrapolation.

According to an example embodiment of the method according to the present invention, it is provided that the lane pixel group is assigned to the two-dimensional pixel data field using a virtual lane boundary that is generated parallel to the marking pixel group and/or to the extended marking pixel group.

In addition, the consistency of the right and left boundary can be determined by checking whether a right and left lane marking were detected in the image. If only one lane marking was detected, there then takes place an association of the other lane on the basis of assumptions such as the width of the roadway, because a lane always has a left and right boundary. In addition, it is checked whether the resulting lane is plausible. For example, an identified lane marking made up of a horizontal and a vertical line is contradictory.

According to an example embodiment of the method according to the present invention, it is provided that the at least one lane pixel group in the two-dimensional pixel data field is allocated using data from a sensor system.

Data or measurement results from additional sensor systems can be fused in the two-dimensional pixel data field, i.e., integrated into the two-dimensional pixel data field corresponding to the represented surrounding environment, in order for example to achieve greater accuracy of the position of objects or lanes, and thus to improve the method for determining the degree of overlap.

Generally, sensor fusion systems are made up of various sensors, such as radar systems and video systems. These systems have different measurement designs and different measurement spaces. Thus, a radar sensor directly measures metric values such as runtimes of signals and qualified distances.

In order to fuse the measurement values, a common reference system is required. In order to represent measurement values from different reference systems, the measurement values have to be transformed. In the transformation of a three-dimensional measurement variable, there result three measurement values in order to determine a two-dimensional variable, thus resulting in a mathematical redundant dimensioning. In the fusion of a two-dimensional variable into the three-dimensional space, this mathematical redundant dimensioning is not present. Additional data are then required. In the case of a camera image, such data are fused using a second image of the same point together with the information concerning the distance that the platform has traveled between the images. The additionally required data result in errors, making the result of the transformation less accurate.

According to a further example embodiment of the method according to the present invention, it is provided that the at least one lane pixel group in the two-dimensional pixel data field is identified using map data of the surrounding environment of the platform.

Just as additional sensor data can be integrated into the two-dimensional pixel data field, map data can also be integrated into the two-dimensional data field, whereby in particular the accuracy of the position of lanes can be improved if in particular the map data contain information about lanes and/or lane markings.

As a result, the method for determining the degree of overlap is made more accurate and is thus improved, because, corresponding to the map data, the lane is known arbitrarily far ahead in the direction of travel.

For this purpose, in particular the map data can be fused with the two-dimensional pixel data field, by orienting the map data to the surrounding environment represented by the two-dimensional pixel data field.

A method is indicated for the identification of a target object in which, in a step, pixels of the two-dimensional pixel data field are allocated to at least two lane pixel groups that correspondingly represent at least two lanes of the surrounding environment in the two-dimensional pixel data field. In a further step, a home lane pixel group is selected from the at least two lane pixel groups. And, in a further step, the degree of overlap of a multiplicity of allocated object pixel groups of the two-dimensional pixel data field with the home lane pixel group is determined according to the method described above.

The identification of a target object, i.e., of an object such as a vehicle traveling in the same lane as the home vehicle, is used for safe and comfortable driving operation of an at least partly automated platform, or for a driver assistance system that for example regulates the distance from a vehicle traveling in front. For this purpose, the degree of overlap with the home lane is determined for a multiplicity of identified and allocated objects, whereby the presence of a target object in the home lane is determined.

In order to detect which lane the home vehicle is traveling in, the lane boundaries are tracked over time using an imaging method. With the knowledge of the position of installation of the camera relative to the platform, or a vehicle, and other vehicle detections in the image, the home lane can be inferred.

Here, the object that comes closest to a lower edge in an image or a corresponding pixel data field of the imaging system is then the object closest to the home vehicle.

That is, in an image that is stored in the two-dimensional pixel data field, the pixel distance of the objects is considered in the horizontal (u-) and in the vertical (v-) direction. In this way, the relative position of the objects to one another can be inferred.

For example, the distance to the object in the image space can be assumed via the v coordinate. Thus, an object at the lower edge in the image is closer to the home vehicle than is an object at the upper image edge. This is because, ultimately, for a regulation the object that is closest to the home vehicle is particularly relevant. The ascertaining of the distances can take place via a simple "pixel counting" in the image.

For the selection of a target object, a surrounding environment of a platform is thus represented by a two-dimensional pixel data field, the two-dimensional pixel data field containing information of a two-dimensional representation of the three-dimensional surrounding environment, the information originating for example from a representation of an imaging system of the surrounding environment of the platform. Pixel groups that represent objects are allocated to this two-dimensional pixel data field, the objects being both identifiable inside the two-dimensional pixel data field or also allocated to the pixel data field as already-identified objects. Moreover, pixel groups are allocated to this two-dimensional pixel data field that represent lanes, the lanes being both identifiable within the two-dimensional pixel data field or also allocated to the pixel data field as already-identified lanes. Moreover, the home lane is identified. To the extent that the allocated pixel groups of the lanes of the two-dimensional pixel data field do not include the pixel groups of the objects, because for example the identification of the lanes does not extend to the objects, the allocated pixel groups of the lanes can be extrapolated using the methods described above. With this information, the degree of the overlap between the home lane and the identified and allocated objects is determined. A target object is then selected as an object that has a certain degree of overlap with the home lane and has a high degree of relevance, such as the smallest distance from the home vehicle.

In accordance with an example embodiment of the present invention, a method is provided for allocating at least one object to lanes. In a step, pixels of the two-dimensional pixel data field are allocated to at least two lane pixel groups that correspondingly represent at least two lanes of the surrounding environment in the two-dimensional pixel data field. In a further step, at least one object pixel group is allocated to pixels of the two-dimensional pixel data field, which group correspondingly represents at least one object. And, in a further step, the degree of overlap of the at least one object with each of the at least two lane pixel groups is determined according to the method described above.

With this example method, for example the surrounding environment of a platform can be put into relation with the objects surrounding it, by determining, for each relevant object of a multiplicity of identified and allocated objects, a degree of overlap with a multiplicity of lanes.

In addition, for all objects identified and allocated in the two-dimensional pixel data field, it can be checked whether they are situated partly or completely within the home lane.

In addition, from the multiplicity of objects situated in the home lane the vehicle that is most relevant at the moment can be selected. The relevance can be determined via some or all of the following factors: the distance from the home vehicle, the time to contact (TTC), the number of adjacent lanes, directional arrows on the lane, a blinker detection, a brake light detection, and/or information from an overhead traffic sign.

In addition, in the selection a minimum overlap between an object boundary, such as the object frame (bounding box) and the home lane can also be required as a criterion. In addition, a prediction, i.e., an estimation, of the further course of the movement of the bounding boxes in the two-dimensional pixel data field can also be taken into account.

In accordance with an example embodiment of the present invention, a method is provided in which a control signal for controlling an at least partly automated vehicle, and/or a warning signal for warning a vehicle occupant, is emitted as a function of the overlap of a lane with an object, determined according to the method described above.

Because the degree of overlap of an identified and allocated object with a lane indicates the use of the lane by this object, in this way for example it is possible to react to the entry or exit of objects, in particular vehicles, into or from the home lane with corresponding driving behavior.

In accordance with an example embodiment of the present invention, an example device is provided that is configured to carry out a method as described above. With such a device, the method can easily be integrated into various systems.

In accordance with an example embodiment of the present invention, a computer program is provided that includes commands that, when the program is executed by a computer, cause the program to carry out one of the methods described above. Such a computer program enables the use of the described method in various systems.

In accordance with an example embodiment of the present invention, an example machine-readable storage medium is provided on which the computer program described above is stored.

Exemplary embodiments of the present invention are presented with reference to FIGS. 1 through 3 and are described in more detail below.

BRIEF DESCRIPTION OF THE DRAWINGS

FIG. 3 shows the steps of the method for determining a degree of overlap.

DETAILED DESCRIPTION OF EXAMPLE EMBODIMENTS

Figure 1:
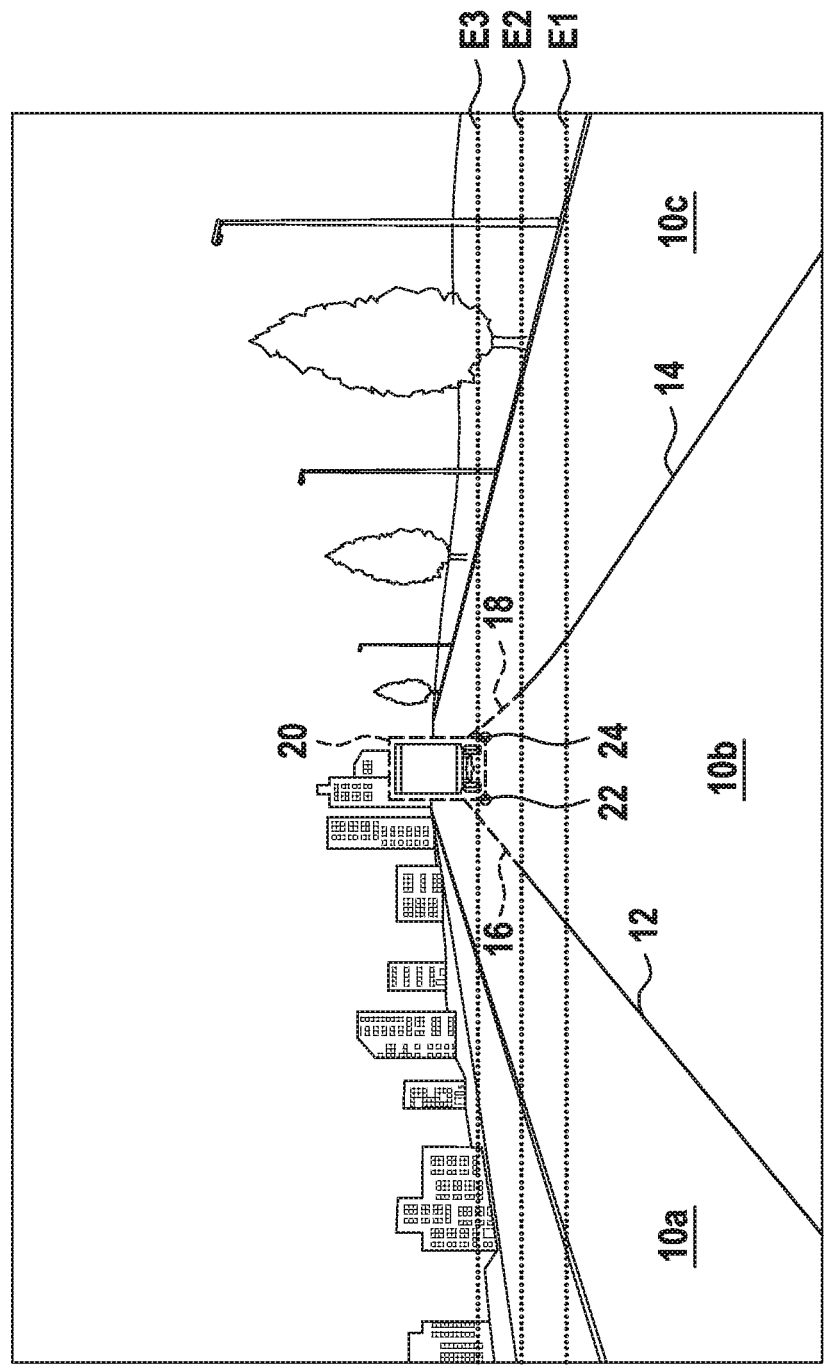
FIG. 1 shows a surrounding environment of a platform, with lanes.

FIG. 1 shows an illustration of a surrounding environment of a platform that has been transformed into a two-dimensional pixel data field by an imaging system. The depicted outlines of static and dynamic objects correspond to regions of the two-dimensional pixel data field that represent the corresponding objects. The at least one object 20 is a depicted rear view of a truck that is situated on a center lane 10b. The left and right sides of center lane 10b are directly adjoined by a left lane 10a and a right lane 10c, respectively. Due to the centering of the represented surrounding environment, it can be inferred that center lane 10b is the home lane.

The pixels of the at least one lane pixel group 10b represent the at least one lane and, according to the method as depicted in FIG. 3, are allocated (S1) to the two-dimensional pixel data field. Center lane 10b is bounded by left and right lane boundaries 12, 14. The pixels of the at least one object pixel group 20 represent the at least one object and are allocated (S2) to the two-dimensional pixel data field. The width of the defined at least one object pixel group 20 is characterized by object pixel pair 22, 24, and is situated on a frame 20 that surrounds object pixel group 20. In FIG. 1, object pixel pair 22, 24 is situated in particular at the lower edge of the frame.

Object pixel pair 22, 24 is defined (S3) and is compared to the lane pixel group in the two-dimensional pixel data field, the at least one object pixel pair 22, 24 being compared (S4) with the lane pixel group within exactly one pixel line of the pixel data field. In FIG. 1, the lane pixel group forms a horizontal line that is defined by the pixels of object pixel pair 22, 24 and is bounded by the left and right lane boundary 12, 16; 14, 18. All pixels between object pixel pair 22, 24, and object pixel pair 22, 24, which together enclose a first set of pixels, are completely situated within lane pixel group 10b, which form the second set of pixels in the pixel line that is defined by object pixel pair 22, 24. As a result, the intersection of the first set of pixels with the second set of pixels is identical to the first set of pixels. In this case, the overlap is complete, and the degree of overlap is 100%.

In FIG. 1, lines E1 through E3 depict equidistant distances on lanes 10a, 10b, and 10c.

FIG. 1 also shows how lane pixel group 10b can be allocated via at least one marking pixel group such as the represented right lane boundary 14, 18 of the two-dimensional pixel data field. For this purpose, a virtual lane boundary, such as the left lane boundary 12 of lane 10b, is constructed by assuming a constant lane width for center lane 10b. The group of pixels that are situated between these two lane boundaries 12, 14 then form lane pixel group 10b.

In addition, FIG. 1 shows how, for example, a marking pixel group 14, which in this case represents the right lane boundary 14 of center lane 10b, can be extended through an extrapolation in the two-dimensional pixel data field. This marking pixel group 14 can be extended with additional pixels of the two-dimensional pixel data field, as is indicated in FIG. 1 by interrupted line 18. Left lane boundary 12 can be extrapolated in correspondingly symmetrical fashion, as is indicated by interrupted line 16.

Via the extrapolated marking pixel groups 16, 18, the at least one center lane pixel group 10b can be allocated and/or enlarged in the two-dimensional pixel data field. In this way, it is achieved that the degree of overlap of object 20 with center lane 10b can still be determined even at a great distance from the home vehicle.

Figure 2:
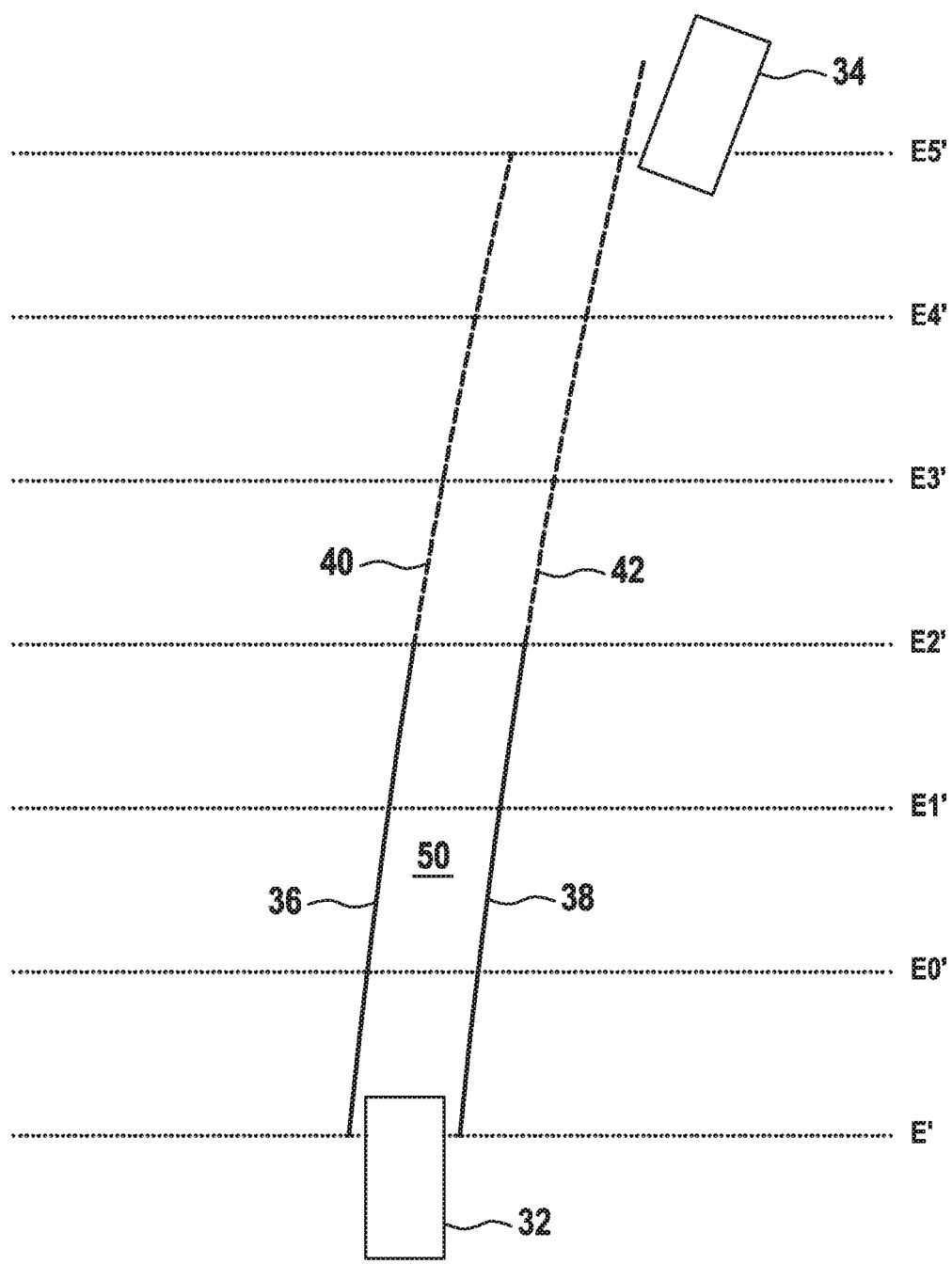
FIG. 2 shows a view of a surrounding environment with a home vehicle.

FIG. 2 illustrates how a home vehicle 32 enters onto a lane 50 whose identified left and right lane boundaries 36, 38 do not, however, extend up to an identified object or vehicle 34. If the estimations of the further course of the left or right lane boundary 40, 42, using a method in a three-dimensional coordinate system, include errors, this can result in an incorrect estimation with regard to the overlap of identified object 34 with home lane 50. Distance lines E', E0' to E5' again indicate equidistant distances.

What is claimed is:

1. A method using a representation of a surrounding environment of a platform as a two-dimensional pixel data field, the method comprising the following steps:
   allocating at least one lane pixel group to pixels of the two-dimensional pixel data field, which correspondingly represent at least one lane;
   allocating at least one object pixel group to pixels of the two-dimensional pixel data field, which correspondingly represent at least one object;
   defining at least one object pixel pair in the two-dimensional pixel data field, the object pixel pair representing a width of the at least one object pixel group;
   comparing (a) a first pixel set that includes the object pixel pair and pixels situated between the object pixel pair and (b) a second set of pixels of the lane pixel group that is situated in a same pixel line of the two-dimensional pixel data field as the object pixel pair; and
   based on the comparison:
   determining an intersection of pixels of the first set of pixels with the second set of pixels; and determining a degree of overlap of the at least one object with the at least one lane based on a number of the pixels of the determined intersection.

2. The method as recited in claim 1, wherein the determining of the degree of overlap is performed by calculating a ratio of the number of pixels of the determined intersection to a number of the pixels of the first set.

3. The method as recited in claim 1, wherein the at least one lane pixel group is allocated to the pixels of the two-dimensional pixel data field via at least one marking pixel group of the two-dimensional pixel data field, which group represents a lane boundary.

4. The method as recited in claim 3, wherein the at least one marking pixel group is extended through an extrapolation in the two-dimensional pixel data field.

5. The method as recited in claim 4, wherein the at least one lane pixel group in the two-dimensional pixel data field is allocated and/or enlarged, via an extrapolated marking pixel group.

6. The method as recited in claim 1, wherein the at least one lane pixel group in the two-dimensional pixel data field is allocated using data of a sensor system.

7. The method as recited in claim 1, wherein the at least one lane pixel group in the two-dimensional pixel data field is identified using map data of the surrounding environment of the platform.

8. The method as recited in claim 1, further comprising:
emitting a control signal for controlling an at least partly automated vehicle and/or a warning signal for warning a vehicle occupant, as a function of the degree of overlap.

9. The method as recited in claim 1, wherein:
the allocating of the at least one lane pixel group includes allocating at least two lane pixel groups to pixels of the two-dimensional pixel data field, correspondingly representing at least two lanes of the surrounding environment in the two-dimensional pixel data field;
the at least one lane for which the degree of overlap of the at least one object is performed includes the at least two lanes; and
the determining of the degree of overlap is performed by executing the comparison of the object pixel pair with each of the at least two lane pixel groups in the two-dimensional pixel data field.

10. A device configured to use a representation of a surrounding environment of a platform as a two-dimensional pixel data field, the device configured to:
allocate at least one lane pixel group to pixels of the two-dimensional pixel data field, which correspondingly represent at least one lane;
allocate at least one object pixel group to pixels of the two-dimensional pixel data field, which correspondingly represent at least one object;
define at least one object pixel pair in the two-dimensional pixel data field, the object pixel pair representing a width of the at least one object pixel group;
compare (a) a first pixel set that includes the object pixel pair and pixels situated between the object pixel pair and (b) a second set of pixels of the lane pixel group that is situated in a same pixel line of the two-dimensional pixel data field as the object pixel pair; and
based on the comparison:
determine an intersection of pixels of the first set of pixels with the second set of pixels; and
determine a degree of overlap of the at least one object with the at least one lane based on a number of the pixels of the determined intersection.

11. A non-transitory machine-readable storage medium on which is stored a computer program that is executable by a computer and that, when executed by computer, causes the computer to perform a method using a representation of a surrounding environment of a platform as a two-dimensional pixel data field, the method comprising the following steps:
allocating at least one lane pixel group to pixels of the two-dimensional pixel data field, which correspondingly represent at least one lane;
allocating at least one object pixel group to pixels of the two-dimensional pixel data field, which correspondingly represent at least one object;
defining at least one object pixel pair in the two-dimensional pixel data field, the object pixel pair representing a width of the at least one object pixel group;
comparing (a) a first pixel set that includes the object pixel pair and pixels situated between the object pixel pair and (b) a second set of pixels of the lane pixel group that is situated in a same pixel line of the two-dimensional pixel data field as the object pixel pair; and
based on the comparison:
determining an intersection of pixels of the first set of pixels with the second set of pixels; and
determining a degree of overlap of the at least one object with the at least one lane based on a number of the pixels of the determined intersection.

12. A method using a representation of a surrounding environment of a platform as a two-dimensional pixel data field, the method comprising the following steps:
allocating at least two lane pixel groups to pixels of the two-dimensional pixel data field, correspondingly representing at least two lanes of the surrounding environment in the two-dimensional pixel data field;
allocating a multiplicity of object pixel groups to pixels of the two-dimensional pixel data field, correspondingly representing a multiplicity of objects;
selecting a home lane pixel group from the at least two lane pixel groups; and
determining a degree of overlap of the multiplicity of objects with a home lane to which the home lane pixel group corresponds by, for each of the allocated multiplicity of object pixel groups:
defining a respective object pixel pair in the two-dimensional pixel data field, the respective object pixel pair representing a width of the respective object pixel group; and
comparing the respective object pixel pair with the home lane pixel group in the two-dimensional pixel data field.

13. The method as recited in claim 12, further comprising identifying, based on a result of the comparison a target object for a distance regulation of a vehicle.

14. The method as recited in claim 13, wherein the target object is a vehicle.

* * * * *